(12) United States Patent
Wobben

(10) Patent No.: US 6,676,122 B1
(45) Date of Patent: Jan. 13, 2004

(54) WIND ENERGY FACILITY WITH A CLOSED COOLING CIRCUIT

(76) Inventor: Aloys Wobben, Argestrasse 19, Aurich (DE), D-26607

( * ) Notice: Subject to any disclaimer, the term of this patent is extended or adjusted under 35 U.S.C. 154(b) by 0 days.

(21) Appl. No.: 10/031,043

(22) PCT Filed: Apr. 27, 2000

(86) PCT No.: PCT/EP00/03828
§ 371 (c)(1),
(2), (4) Date: May 30, 2002

(87) PCT Pub. No.: WO01/06121
PCT Pub. Date: Jan. 25, 2001

(30) Foreign Application Priority Data

Jul. 14, 1999 (DE) .......................................... 199 32 394
Jul. 30, 1999 (DE) .......................................... 199 36 069
Jan. 7, 2000 (DE) .......................................... 100 00 370

(51) Int. Cl.$^7$ ................................................. F03D 11/00
(52) U.S. Cl. ............................ 270/55; 290/44; 415/119
(58) Field of Search .............................. 290/43, 44, 54, 290/55; 415/119, 173.1

(56) References Cited

U.S. PATENT DOCUMENTS

| | | | | | |
|---|---|---|---|---|---|
| 3,721,290 A | * | 3/1973 | Butler, Jr. | ..................... | 165/85 |
| 4,031,173 A | * | 6/1977 | Rogers | ......................... | 261/24 |
| 4,036,021 A | * | 7/1977 | Kelp | ........................... | 60/692 |
| 6,100,600 A | * | 8/2000 | Pflanz | ........................ | 290/54 |
| 6,400,039 B1 | * | 6/2002 | Wobben | ...................... | 290/44 |
| 6,454,527 B2 | * | 9/2002 | Nishiyama et al. | ......... | 415/119 |

FOREIGN PATENT DOCUMENTS

| | | | |
|---|---|---|---|
| DE | 3527951 | * | 12/1987 |
| DE | 19528862 A1 | | 6/1997 |
| DE | 198 02 574 A1 | | 3/1999 |
| WO | WO99/30031 | | 6/1999 |
| WO | WO 00/68570 | | 11/2000 |

* cited by examiner

Primary Examiner—Nicholas Ponomarenko
(74) Attorney, Agent, or Firm—SEED IP Law Group PLLC

(57) ABSTRACT

The conversion of energy regularly results in losses in the form of heat. This applies both for the conversion of kinetic energy of wind into electrical energy in the generator of a wind energy facility, where these losses regularly occur in the main driving line of the wind energy facility, and also for the electrical feeding of energy generated by the wind energy facility into a medium voltage network. For this purpose, regular devices of power electronics, e.g., rectifiers, and/or transformers, are necessary. In the main driving line, which is mounted in the nacelle for a wind energy facility, the losses occur overwhelmingly in the gears, at the bearings, and in the generator or at other control units, such as, e.g., in the hydraulic systems or similar control and regulation units, which adjust the rotor blades or turn the wind energy facility into the wind. For gearless wind energy facilities, e.g., model E-66 of Enercon, the main losses occur at the main driving line in the generator, i.e., in the nacelle (head) of the wind energy facility. The task of the invention is to prevent the previously mentioned disadvantages and to provide a cooling device for a wind energy facility, which reduces the losses of the wind energy facility. Wind energy facility with a completely closed or at least partially closed cooling circuit, with which the heat to be dissipated from the cooling circuit is dissipated by the tower or the nacelle of the wind energy facility.

37 Claims, 4 Drawing Sheets

WIND ENERGY FACILITY WITH A CLOSED COOLING CIRCUIT

BACKGROUND OF THE INVENTION

The conversion of energy regularly results in energy being lost in the form of heat. This applies to both the conversion of thee kinetic energy of wind into electrical energy in the generator of a wind energy facility, where these losses regularly occur in the main driving line of the wind energy facility, and also for the electrical feeding of energy generated by the wind energy facility into a medium voltage network. For this purpose, regular devices of power electronics, e.g., rectifiers, and/or transformers, are necessary. In the main driving line, which is mounted in the nacelle for a wind energy facility, the losses occur overwhelmingly in the gears, at the bearings, and in the generator or at other control units, such as, e.g., in the hydraulic systems or similar control and regulation units, which adjust the rotor blades or turn the wind energy facility into the wind. For gearless wind energy facilities, e.g., model E-66 of Enercon, the main losses occur at the main driving line in the generator, i.e., in the nacelle (head) of the wind energy facility.

For the power supply, losses occur overwhelmingly at the power transformer and, if necessary, in the power electronics, e.g., in the rectifier.

For a 1.5 MW wind energy facility, the losses can be in the range of 60–100 kW. Up until now, these losses ere dissipated into the environment by means of fans. In this way, cold air is suctioned in from the outside by the fans to cool the corresponding components, e.g., the generator. The heated air is then blown back outside.

Consideration has also already been given to cooling the generator with water and to then cooling the heated water back down with a heat exchanger. All of these known solutions have in common a large amount of air that is always needed from the outside. This is particularly disadvantageous if the outside air is humid or, particularly in coastal regions, if it has a high salt content, and the cooling elements are then exposed to this humid and high salt content air. This problem is especially extreme with wind energy facilities that stand directly on the coast or, in offshore technology, directly in salt water.

SUMMARY OF THE INVENTION

One object of the invention is to provide a cooling device for a wind energy facility which reduces its losses.

The basic concept of the invention is to provide a completely closed or in an alternative embodiment, a partially closed cooling circuit for a wind energy facility, so that no or practically no outside air has to be used for cooling. In this way, the cooling air circulates within the wind energy facility from its nacelle to the tower or to the base of the wind energy facility and the energy stored by the coolant, preferably air, during the cooling is dissipated by means of the tower of the wind energy facility. The tower of the wind energy facility is always exposed to the wind, so that the tower of the wind energy facility acts as a cooling element or a heat exchanger, which dissipates the stored energy to the wind enveloping the tower.

Another advantage of the concept according to the invention is that the tower is also heated from the inside out for very cold outside temperatures of approximately −20° to −30° C. by its function as a heat exchanger and a load-bearing part of the wind energy facility. Due to this fact, the wind energy facility can remain in operation. According to the state of the art up until now, a special cold-resistant steel had to be used for very cold locations, such as, e.g., northern Sweden, Norway, Finland, Canada, etc.

If desired, due to very low outside temperatures below the freezing point, it is also possible to combine the heating of the rotor blades with the cooling circuit, so that the rotor blades can be heated with the fluid in the cooling circuit.

The coolant is cooled by the tower due to the fact that at least one air channel is formed in the tower itself (inside or outside), and the heated air flows through this channel such that the air can dissipate its energy at least partially at the tower walls.

One air channel is preferably formed such that the tower is configured with double walls, so that one part of the cooling channel is formed through the load-bearing wall of the tower.

By using the tower or rotor blades of the wind energy facility, which are usually manufactured out of steel, as a cooling element or a heat exchanger, a component that is already present and required by every wind energy facility is used for an advantageous function. Heated air flows from the generator or transformer into the steel tower at its outer wall. This outer wall has a very large surface area, e.g., for a 1.5 MW facility, approximately 500 $m^2$, and thus offers a very large heating/cooling surface. The wind enveloping the tower continuously cools this surface.

When the blades are used a the heat exchanger, this provides rapid cooling since they present a large surface area that rotates through the wind at high speeds. The further advantage is that the rotor blades are heated, which is an advantage in ice forming conditions since it will keep the blades free of snow and ice and save the expense of providing a separate heater for the rotor blades.

BRIEF DESCRIPTION OF THE SEVERAL VIEWS OF THE DRAWING(S)

DETAILED DESCRIPTION OF THE INVENTION

Figure 1:
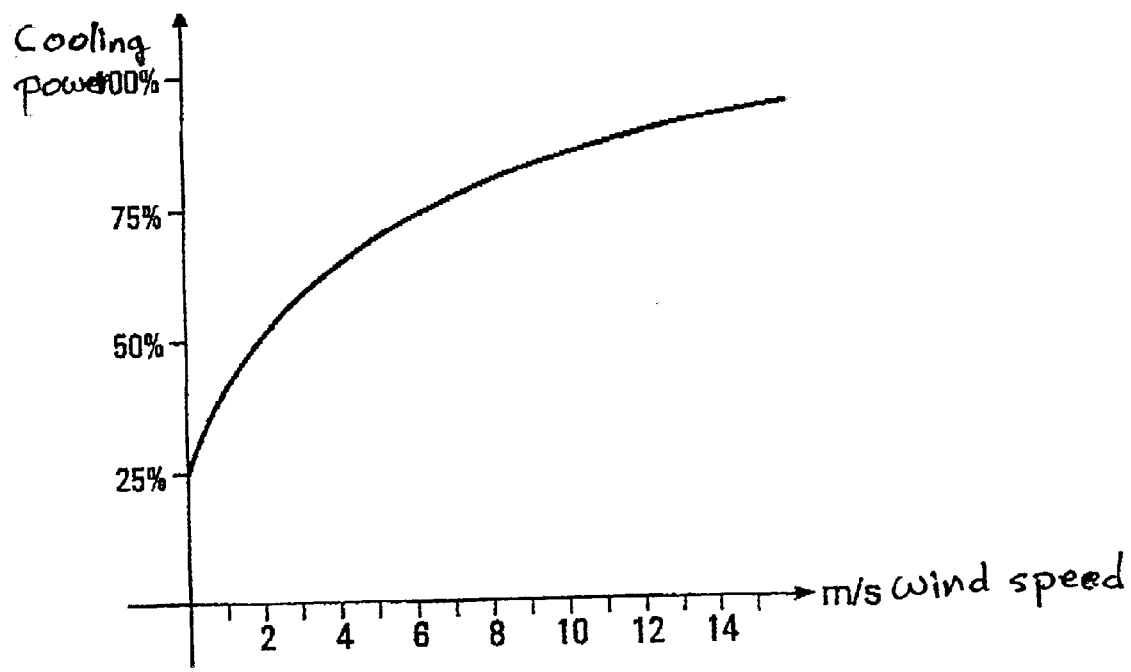
FIG. 1 shows the correlation between cooling power and wind speed.
Figure 2:
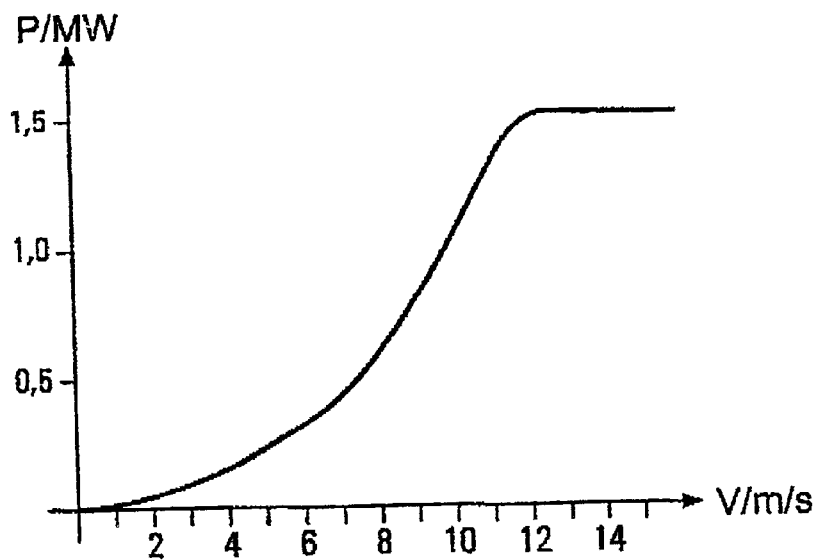
FIG. 2 shows the correlation between generator power and wind speed.

The possible cooling power of the wind increases with rising wind speed. This correlation is shown in FIG. 1. With rising wind speed, the generator power also rises, and thus, also the heat created by the generator due to power loss. The correlation between the generator power and the wind speed is shown in FIG. 2. Thus, rising heat due to increased power losses can be dissipated relatively easily because the cooling power of the tower of the wind energy facility also rises with the increasing power loss.

Figures 3, 4:
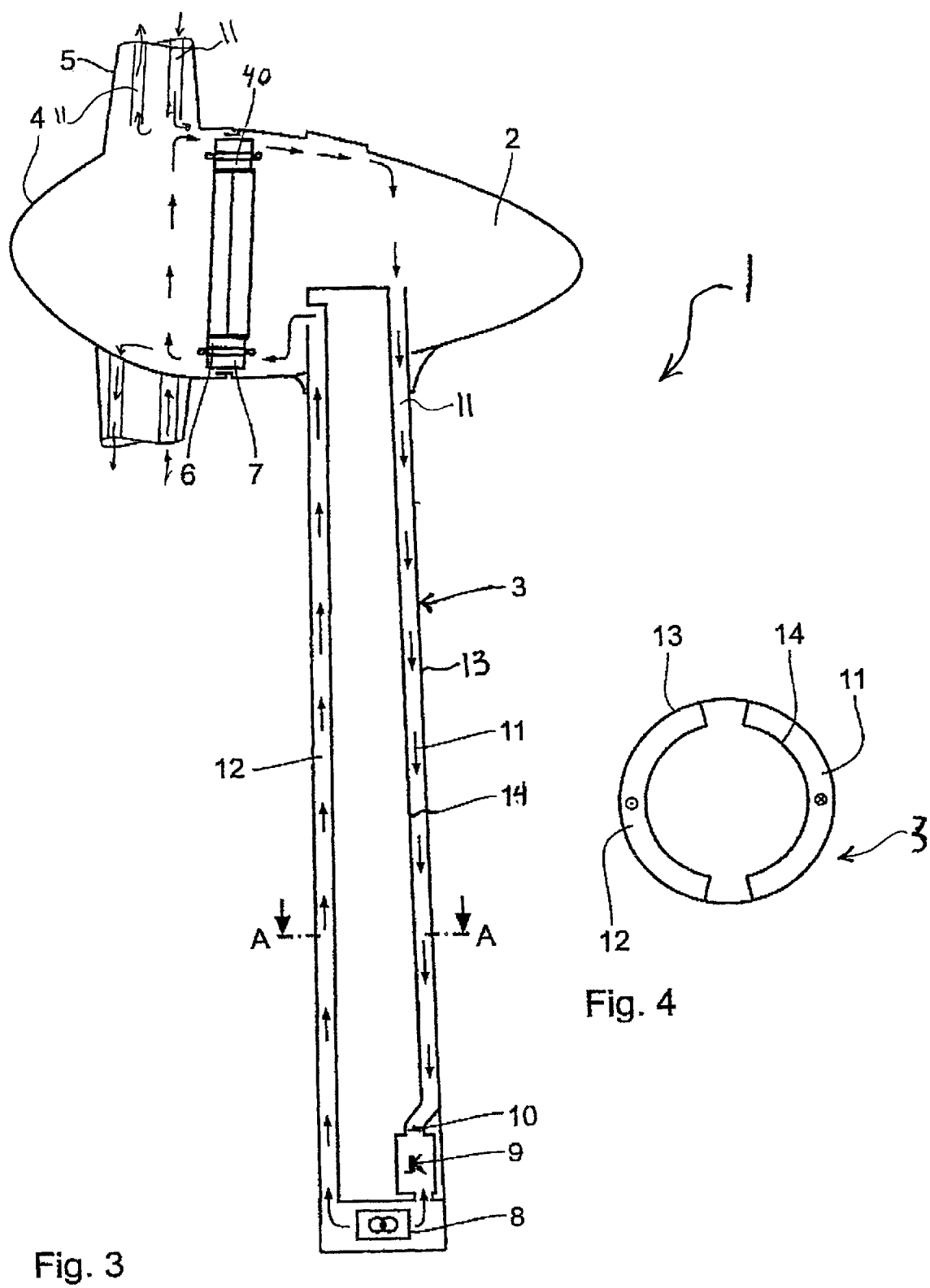
FIG. 3 shows an embodiment of the invention with reference to a wind energy facility.
FIG. 4 shows a cross section of the tower walls cut along the line A—A from FIG. 3.

FIG. 3 shows an embodiment of the invention with reference to a wind energy facility according to model E-66 from Enercon, which provides a generator power of 1.5 MW. FIG. 3 shows a cross section of a wind energy facility 1 in with a nacelle 2 at the end of the head, which is supported by a tower 3. This tower 3 is anchored in the ground (not shown).

The nacelle 2 houses the main driving line of the wind energy facility. This main driving line comprises a rotor 4 with rotor blades 5 (only the base of which are shown for ease in illustration), as well as a generator 40 connected to the rotor. This generator 40 has a generator rotor 6 and a generator stator 7. If the rotor 4, and thus the generator rotor 6, turns, then electrical energy, e.g., as alternating current (or as direct current) is generated.

The wind energy facility further has a transformer 8, and in some embodiments a rectifier 9 connected in series before this transformer 8. The rectifier 9 supplies electrical energy in the form of alternating or three-phase current to the transformer 8. The transformer 8 feeds the energy generated by the wind energy facility into a network, preferably a medium voltage network (not shown).

The tower 3 is configured in sections with double walls 13 and 14, as can be seen in FIG. 3, and in each double-walled region, a cooling channel is present. In this cooling channel 11, a fan 10 is provided (several fans can also be provided), which drives the air through the cooling channels 11. A return channel 12 is also provided.

In one alternative embodiment, a cooling channel 11*a* runs also through the blades 5, as shown in FIG. 3. This cooling channel 11*a* has a dual function, to cool the generator and also to heat the rotor blades. In those environments where snow or ice build up on rotor blades and may prevent efficient operation, use of the already present and locally generated heat to provide the deicing is much more economical since heaters may not need to be installed for deicing on the rotor blades. Also, the rotor blades provide a broad, exposed surface area for raid cooling and dissipation of large amounts of heat. The cooling channels 11*a* are preferably located on those edges most susceptible to ice build up, so that a direct heat transfer from the fluid to the part of the blade needing the heat occurs. Alternatively, one or more cooling channels 11*a* can be located on the broad front exposed surface of the blade for the most exposure to the large surface area in the wind.

The cooling fluid used is any accepted coolant. In a preferred embodiment, the cooling fluid is air. The air is preferably dry air that has been placed in the channels from ambient air on days of low moisture in the ambient air. Of course, the air can be made more dry by dehumidifiers if desired. Using dry or conditioned air with moisture removed will ensure that even on very cold days, no moisture from the air condenses out and freezes inside the channels 11, 12 or 11*a*. If particularly clean, moisture free air is desired, it can be filtered to remove all water vapor or pure nitrogen gas or other heat transfer gas can be used. A liquid, such as antifreeze can be used for the cooling fluid if desired.

FIG. 4 shows a cross section of the tower walls cut along the line A—A from FIG. 3. It can be seen here that in the illustrated example, two cooling channels 11, 12 are formed, and the tower is configured in a certain region with double walls. The air heated by the generator now flows through an air channel out of the machines in the nacelle 2 into the upper tower region. There, the heated air is directed to the inner side of the steel tower. As already mentioned, the steel tower is configured with double walls over a great length, e.g., approximately 50–80%, with an outer wall 13 and an inner wall 14, and there it forms the cooling channel 11. Here, the inner wall 14 in the cooling channel can be made of a simple material, e.g., plastic or cloth. The heated air from generator 40 must now flow along a large stretch on the inside of the steel tower 3. In this way, the tower or its steel is heated over a large surface area and the air is cooled.

In the lower region of the lower there is the rectifier 9 and the medium voltage transformer 8 (and/or additional electrical devices). These components must also be cooled. The cooled generator air is now guided first through the rectifier 9. Here, the devices of the power electronics are actively cooled. The air output from the rectifier is now further guided to the transformer 8 and also cools the transformer. Subsequently, the air rises through the second cooling channel 12 back upwards to the machine house and to the generator 40.

The cooling circuit is thus closed and it is not necessary to introduce cooled air from the outside.

For cooling all components, particularly sensitive components, the wind energy facility always uses the same air. It is a closed system, and once sealed with the proper air, is not later opened.

If necessary, air filters and additional cooling devices (e.g., heat exchangers) can obviously also be mounted in the cooling channel, if desired.

The advantages of the invention consist in the fact that no high salt content or humid air comes into contact with the sensitive components, such as generators, rectifiers, and transformers. The risk of corrosion is thus drastically reduced within the machine housing and the tower. In the wind energy facility, particularly in its tower, there can be no build up of mold or fungi.

In one alternative embodiment, the cooling channel may have a valve that can be held open at all times or selectively opened. If it is desired to exchange outside air with the cooling fluid, the valves can be opened so that some or all of the cooling fluid is obtained from ambient air and is exhausted to ambient air. In some dry environments that require extra cooling, this may be preferred, such as in large desert areas from the ocean, such as Saudi Arabia, Arizona, New Mexico, and the like. The system can thus be a partially closed system in one alternative embodiment or a system that can be selectively opened and closed in yet a further embodiment.

In total, for the cooling of the entire wind energy facility, considerably less energy is required than before because (secondary) cooling power is produced from the outside of the tower by the wind.

By forming cooling channels in the rotor blades and by connecting these cooling channels to the cooling circuit according to the invention, it is also possible to introduce the air heated by the generator first into the cooling channels of the rotor blades, so that during cold periods, particularly for temperatures around the freezing point, the rotor blades can be deiced. The formation of cooling channels in a rotor blade is also known, e.g., from DE 195 28 862.9.

The formation of the cooling channels in the machine housing is done through corresponding walls and air guiding devices, which direct the air such that it passes the elements, such as, e.g., the generator.

If the cooling power of the tower is not sufficient, e.g., on very warm days, it is also possible to use additional cooling elements, such as, e.g., conventional heat exchangers, in the cooling circuit.

Figure 5:
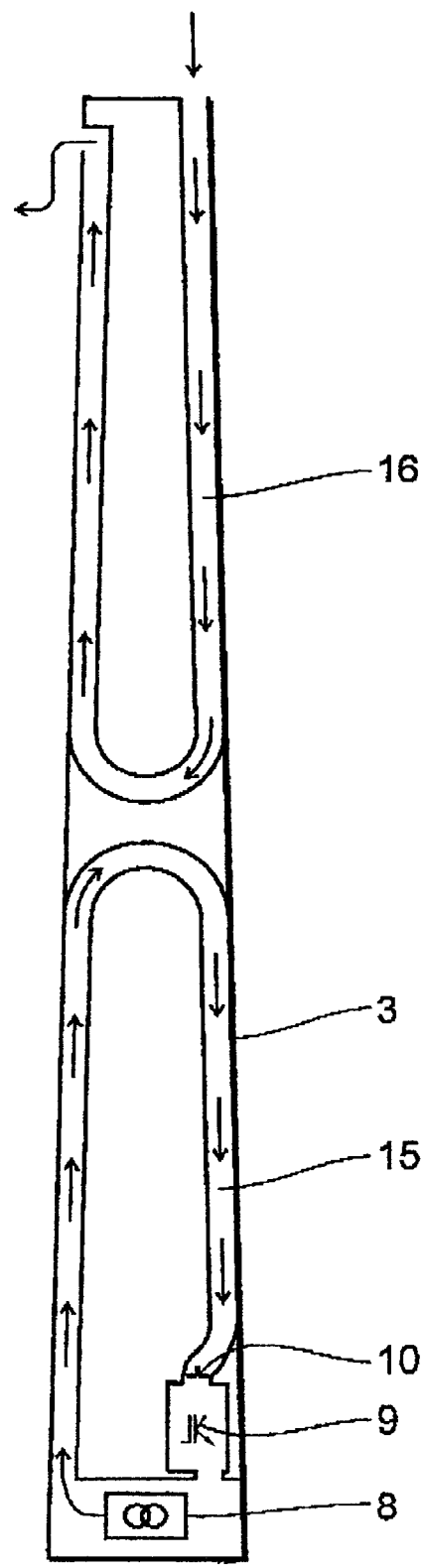
FIG. 5 shows an alternative embodiment of the cooling circuit according to FIG. 3.

FIG. 5 shows an alternative embodiment of the cooling circuit according to FIG. 3. Here, it can be seen that the wind energy facility has two separate and independent closed cooling circuits 15, 16, which each dissipate stored heat to the tower. However, the two cooling circuits 15, 16 are separated from each other, which is different than the configuration shown in FIG. 3. Here, each of the individual cooling circuits 15, 16 has a passage or a cross channel within the tower 3 at the turning point, so that the air flowing along one wall of the tower is directed to the opposite side of the tower and thus is further cooled for the unit to be cooled, which can be the generator 40 or the power electronics of the transformer 8, rectifier 9 and other electronics. The fluids in each circuit can be different from each other. The fluid in top circuit 16 can be air, while fluid in the bottom circuit 15 can be oil, for example.

Figure 6:
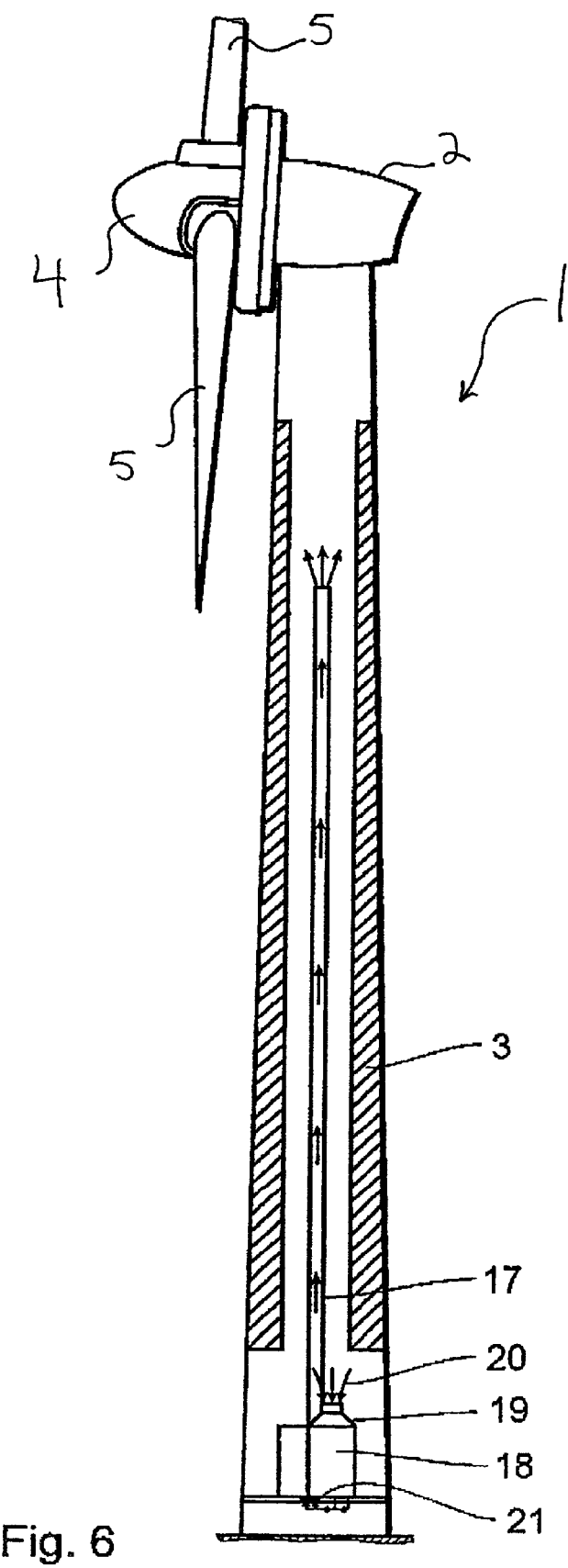
FIG. 6 shows an additional embodiment of a wind energy facility according to the invention.

FIG. 6 shows an additional embodiment of a wind energy facility according to the invention. Here, an air channel, e.g., an exhaust tube 17, leads through the interior of the lower tower section. It can extend along only part or nearly all the length of tower 3. This can also be retrofitted very easily, e.g., to an existing wind energy facility and mounted or suspended in the tower 3. Heated air originating from a power box 18, e.g., 600 kW power box having a transformer and rectifier therein, is guided upwards from the tower base through this exhaust tube 17 and is output from the exhaust tube 17 into the tower. From there, the heated air flows back downwards after cooling at the tower walls and there it can be suctioned again by a ventilation device 20 (for supply air), which is coupled by means of an air hood 19 to the power box 18. The exhaust tube 17 can be connected directly at the air outlet of the power box 18 or there can be a second ventilation device 21, which suctions the heated air of the power box 18 and blows it into the exhaust tube 17, at the input of the exhaust tube 17. The exhaust tube is preferably made out of plastic and thus it is very easily realized and has a very small weight, which simplifies its attachment and retrofitting to a wind energy facility. In one embodiment, the tower 3 of FIG. 6 is a hollow tube that is generally closed and may be sealed. The exhaust tube 12 is placed, with the ventilation device 20 into the interior of the tube. Air is circulated through the interior of the tower to provide cooling of the power box 18 and/or nacelle 2 having a generator therein. The exhaust tube 17 and ventilation device 20 can also be placed at the base of the nacelle and blow air downward into the tower 3. In this embodiment, the same air is repeatedly circulated to cool the various components and at the same time provide some heating of the tower as the heat is transferred. This is a closed system, or could be termed a partially closed system.

In an alternative embodiment, the tower 3 has no interior chamber but is rather in the form of steel beams, such as I beam, twin I beams, or the like. In this embodiment the exhaust tube 17 is placed along side the metal structure so that air exiting enters the open air adjacent the structure and is cooled by the ambient air and steel tower. New ambient air enters the intake of the ventilation device 20. Such a system could also be retrofit to the generator 40 in the nacelle 2 if desired. The system of FIG. 6 can be thus a partially closed system in which outside air is obtained, placed in a closed system and circulated in a closed system for distance before it is released to open air.

For improving the cooling effect of the nacelle 2, the nacelle can be completely or partially made out of metal, preferably aluminum, in order to also take advantage of the cooling effect of the nacelle, which is constantly enveloped by wind, and thus to increase the generator cooling. Here, it can also be advantageous to equip the nacelle on the inside with a surface area increasing structure, e.g., cooling ribs.

As first tests show, the configuration of a closed cooling circuit with the use of the air channel shown in FIG. 6 is extremely effective and particularly cost effective, because the investment necessary for developing an air channel, particularly a plastic exhaust tube, is only very small in comparison with a heat exchanger and its constant maintenance costs. In addition, the cooling is extremely effective.

I claim:

1. Wind energy facility (1) with a completely closed or at least partially closed cooling circuit, with which the heat to be dissipated from the cooling circuit is dissipated by the tower (3) or the nacelle (2) of the wind energy facility (1).

2. Wind energy facility according to claim 1, characterized in that the tower (3) has at least one cooling channel (11, 12), and the coolant, preferably air, flows through this channel.

3. Wind energy facility according to one of the preceding claims, characterized in that both the driving line (3, 4) of the wind energy facility or parts of the driving line and/or the electrical devices (8, 9) for converting the electrical energy are connected to the cooling circuit.

4. Wind energy facility according to one of the preceding claims, characterized in that the tower (3) is configured with two walls over at least two sections along its longitudinal axis (FIG. 4) and a double-walled region forms a cooling channel (12, 11), with which the heated air introduced into the cooling channel dissipates its heat to the outer wall of the tower (3).

5. Wind energy facility according to one of the preceding claims, characterized in that the same air is used essentially continuously for cooling the main driving line (3, 4), as well as the devices (8, 9) of the power electronics.

6. Wind energy facility according to one of the preceding claims, characterized in that the cooling channel is supplied by at least one fan (10) that serves to circulate air within the cooling circuit.

7. Wind energy facility according to one of the preceding claims, characterized in that the wind energy facility can be kept in operation even for outside temperatures of approximately −20° C. to −40° C., and the tower can be heated by the cooling circuit.

8. Use of the tower of a wind energy facility as a cooling element and/or a heat exchanger for cooling air heated by devices that generate heat, e.g., the driving line and/or electrical device for converting electrical energy, of the wind energy facility.

9. Wind energy facility according to one of the preceding claims, characterized in that the wind energy facility has at least two completely closed or at least partially closed cooling circuits, wherein one cooling circuit serves for cooling the driving line of the wind energy facility, and the other cooling circuit serves for cooling the electrical device for conversion of electrical energy.

10. Wind energy facility according to one of the preceding claims, characterized in that there is at least one air line that serves to transport heated air.

11. Wind energy facility according to claim 10, characterized in that the air line is formed by a tube connected to a heat generator, e.g., to the air outlet opening of an electrical device for converting electrical energy, and/or parts of the driving line (generator).

12. Wind energy facility according to claim 11, characterized in that the tube is connected at the air inlet side to a ventilation device (fan), by means of which heated air is blown into the tube.

13. Wind energy facility according to one of the preceding claims 10–12, characterized in that the tube is more than ten meters long, preferably more than twenty-five meters long, and it is formed in the lower part of the tower such that heated air originating from an electrical device for converting electrical energy, e.g., at a switching box or a power box, is blown through the tube, and heated air is output again at the tube outlet, so that it can be cooled at the tower wall and then flow back to the tower base.

14. Wind energy facility according to one of the preceding claims, characterized in that the nacelle is completely or partially made out of a metal, preferably aluminum.

15. Wind energy facility according to claim 14, characterized in that the nacelle is equipped completely or partially with cooling ribs or other means for increasing the surface area of the nacelle.

16. The wind energy facility according to claim 1, wherein the nacelle is equipped completely or partially with cooling ribs or other means for increasing the surface area of the nacelle.

17. The wind energy apparatus of claim 16, wherein the cooling system is retrofit to the tower and includes a fluid transport tube that is adjacent the tower walls.

18. A wind energy apparatus comprising:
    driving line for converting kinetic energy of the wind into electrical energy, said driving line including a rotor, rotor blades, and a generator connected to said rotor;
    a nacelle for housing said driving line;
    a transformer connected to the electrical output of the generator for feeding said electrical energy into a voltage network;
    a tower for supporting said nacelle; and
    a cooling system located within the tower.

19. The wind energy apparatus of claim 18, wherein the said cooling system comprises:
    a tower cooling channel within said tower;
    a nacelle cooling channel;
    a flow guiding device in said nacelle cooling channel for directing fluid near said driving line; and
    a fluid flowing through said tower cooling channels and nacelle cooling channels for providing heat exchange to outer walls of said tower.

20. The wind energy apparatus of claim 19, wherein the cooling system further comprises:
    a cooling channel formed within said rotor blades, wherein said fluid, as heated by said generator, can circulate through said rotor blade to heat said rotor blade.

21. The wind energy apparatus of claim 19, wherein the inner walls of said tower cooling channel arc comprised of plastic.

22. The wind energy apparatus of claim 19, wherein said cooling system further comprises:
    heat exchange devices mounted to said tower cooling channels for additional heat exchange.

23. The wind energy apparatus of claim 18, wherein the said cooling system comprises of:
    said tower configured in sections with double walls for forming two tower cooling channels;
    at least one nacelle cooling channel;
    at least one flow guiding device in said nacelle cooling channel for directing fluid near said driving line;
    a first individual cooling circuit is positioned at the lower portion of said tower, and fluid flows through said tower cooling channels providing heat exchange to said rectifier, said transformer and outer walls of said tower; and a second individual cooling circuit is positioned at the upper portion of said tower, wherein fluid flows through said tower cooling channels and said nacelle cooling channel providing heat exchange to outer walls of said tower, said generator, and said nacelle.

24. The wind energy apparatus of claim 23, wherein said cooling system further comprises:
    a cooling channel formed within said rotor blades, wherein fluid in said second individual cooling circuit is heated by said generator, and circulates through said rotor blade to heat said rotor blade.

25. The wind energy apparatus of claim 23, wherein the inner walls of said tower cooling channels are comprised of plastic.

26. The wind energy apparatus of claim 23, wherein said cooling system further comprises heat exchange devices mounted to said tower cooling channels for additional heat exchange.

27. A heat transfer system comprising:
    a tower;
    a heat source adjacent said tower;
    an exhaust tube adjacent an interior section of said tower; and
    a ventilation device coupled to said heat source for obtaining fluid and circulating the fluid adjacent the tower.

28. The heat transfer system of claim 27, wherein said exhaust tube is connected to the outlet of a power box as the heat source for suctioning heated fluid from said power box and blowing it into said exhaust tube thereby cooling the power box and heating the outer walls of said tower.

29. The heat transfer system of claim 28, further comprising a second ventilation device for suctioning heated fluid from said power box and blowing it into the input base of said exhaust tube thereby heating the outer walls of said tower.

30. The heat transfer system of claim 27, wherein the exhaust tube is made of plastic.

31. The heat transfer system of claim 27, wherein said tower is in the form of a hollow tube and the exhaust tube is within the hollow tube of the tower for circulating fluid therein.

32. The heat transfer system of claim 27, wherein said tower is a solid beam tower and the exhaust tube is placed adjacent said tower.

33. The heat transfer system of claim 27, wherein the heat source is a wind powered generator located at a top position of said tower and said exhaust tube extends from a top portion of said tower downward.

34. A method for supplying heat exchange to a wind energy apparatus comprising:
    cooling a generator by flowing fluid through a nacelle cooling channel and near said generator; and
    transferring heat from said fluid to an outer wall of a tower as said fluid flows downward through a tower cooling channel.

35. The method of claim 34, wherein said fluid also flows through a rotor blade cooling channel within a rotor blade upon completing flow near said generator in said nacelle cooling channel, thereby heating said rotor blades.

36. A method for supplying heat exchange to a wind energy apparatus comprising:
    cooling a generator by flowing a first fluid near said generator within a nacelle cooling channel;
    heating an outer wall of a tower as the first fluid flows through a first tower cooling channel;

crossing through the middle of said tower;

circulating the first fluid within a first individual cooling circuit through said nacelle cooling channel, near said generator, and through said first tower cooling channel;

cooling a transformer by flowing a second fluid near said transformer within a second tower cooling channel;

heating an outer wall of said tower as the second fluid flows through said second tower cooling channel; and circulating the second fluid within said second individual cooling circuit.

37. A method for supplying heat exchange to a wind energy apparatus comprising:

positioning an exhaust tube in the middle of a tower;

blowing heated fluid from a power box positioned at base of said tower into bottom end of said exhaust tube;

heating outside walls of said tower with said fluid exiting top end of said exhaust tube; and re-circulating said fluid back into said power box with said ventilation device.

* * * * *

UNITED STATES PATENT AND TRADEMARK OFFICE
CERTIFICATE OF CORRECTION

PATENT NO. : 6,676,122 B1
DATED : January 13, 2004
INVENTOR(S) : Aloys Wobben

It is certified that error appears in the above-identified patent and that said Letters Patent is hereby corrected as shown below:

<u>Column 6, line 9 through Column 7, line 14,</u>
Delete all claims and replace with claims below --1. A wind energy facility with a completely closed or partially closed cooling circuit, with which the heat to be dissipated from the cooling circuit is dissipated by the tower or the nacelle of the wind energy facility.

2. The wind energy facility according to claim 1, wherein the tower has at least one cooling channel, and the coolant flows through this channel.

3. The wind energy facility of claim 2 wherein the coolant is air.

4. The wind energy facility according to claim 1, wherein both the driving line of the wind energy facility or parts of the driving line and/or the electrical devices for converting the electrical energy are connected to the cooling circuit.

5. The wind energy facility according to claim 1, wherein the tower is configured with two walls over at least two sections along its longitudinal axis and a double-walled region forms a cooling channel, with which the heated coolant introduced into the cooling channel dissipates its heat to the outer wall of the tower.

6. The wind energy facility according to claim 1, wherein the same coolant is used generally continuously for cooling the main driving line, as well as the devices of the power electronics.

7. The wind energy facility according to claim 2, wherein the cooling channel is supplied by at least one fan that serves to circulate coolant within the cooling circuit.

8. The wind energy facility according to claim 1, wherein the wind energy facility can be kept in operation even for outside temperatures of approximately -20°C to -40°C, and the tower can be heated by the cooling circuit.

9. Use of the tower of a wind energy facility as a cooling element and/or a heat exchanger for cooling air heated by devices that generate heat, e.g., the driving line and/or electrical device for converting electrical energy, of the wind energy facility.

10. The wind energy facility according to claim 1, wherein the wind energy facility has at least two completely closed or at least partially closed cooling circuits, wherein one cooling circuit serves for cooling the driving line of the wind energy facility, and the other cooling circuit serves for cooling the electrical device for the conversion of electrical energy.

11. The wind energy facility according to claim 1, wherein there is at least one coolant line that serves to transport heated coolant.

UNITED STATES PATENT AND TRADEMARK OFFICE
CERTIFICATE OF CORRECTION

PATENT NO. : 6,676,122 B1
DATED : January 13, 2004
INVENTOR(S) : Aloys Wobben

It is certified that error appears in the above-identified patent and that said Letters Patent is hereby corrected as shown below:

Column 6, line 9 through Column 7, line 14 (cont'd),

12. The wind energy facility according to claim 11, wherein the coolant line is formed by a tube connected to devices that generate heat within the wind energy facility.

13. The wind energy facility according to claim 12, wherein the tube is connected at the coolant inlet side to a ventilation device, by means of which heated coolant is blown into the tube.

14. The wind energy facility according to claim 12, wherein the tube is more than ten meters long, and is formed in the lower part of the tower such that heated coolant originating from an electrical device for converting electrical energy is blown through the tube, and heated coolant is output again at the tube outlet, so that it can be cooled at the tower wall and then flow back to the tower base.

15. The wind energy facility according to claim 1, wherein the nacelle is completely or partially made out of a metal. --.

Signed and Sealed this

Twenty-ninth Day of November, 2005

JON W. DUDAS
*Director of the United States Patent and Trademark Office*